US012615358B2

(12) United States Patent
Peeters et al.

(10) Patent No.: US 12,615,358 B2
(45) Date of Patent: Apr. 28, 2026

(54) MOIRE REDUCTION IN AN AUTOSTEREOSCOPIC DISPLAY DEVICE

(71) Applicant: Dimenco Holding B.V., Veldhoven (NL)

(72) Inventors: Patrick Godefridus Jacobus Maria Peeters, Veldhoven (NL); Hubertus Petrus Cornelis van Kuringen, Veldhoven (NL); Silvino José Antuña Presa, Veldhoven (NL)

(73) Assignee: Dimenco Holding B.V., Veldhoven (NL)

( * ) Notice: Subject to any disclaimer, the term of this patent is extended or adjusted under 35 U.S.C. 154(b) by 3 days.

(21) Appl. No.: 18/869,387

(22) PCT Filed: May 30, 2023

(86) PCT No.: PCT/NL2023/050301
§ 371 (c)(1),
(2) Date: Nov. 26, 2024

(87) PCT Pub. No.: WO2023/234774
PCT Pub. Date: Dec. 7, 2023

(65) Prior Publication Data
US 2026/0082025 A1     Mar. 19, 2026

(30) Foreign Application Priority Data

May 31, 2022    (NL) ...................................... 2032040

(51) Int. Cl.
*H04N 13/305* (2018.01)
*G02B 3/00* (2006.01)
(Continued)

(52) U.S. Cl.
CPC ......... *H04N 13/305* (2018.05); *G02B 3/0037* (2013.01); *G02B 3/12* (2013.01);
(Continued)

(58) Field of Classification Search
CPC ............... H04N 13/305; H04N 13/359; H04N 2213/001; G02B 3/0037; G02B 3/12; G02B 30/28
See application file for complete search history.

(56) References Cited

U.S. PATENT DOCUMENTS

2008/0204872 A1*    8/2008    Ijzerman .............. H04N 13/359
                                                        348/E13.044
2016/0011427 A1*    1/2016    Lin ........................ G02B 30/27
                                                        349/15

(Continued)

FOREIGN PATENT DOCUMENTS

CN          1748169 A       3/2006
TW          201432348 A     8/2014
(Continued)

OTHER PUBLICATIONS

"International Application Serial No. PCT/NL2023/050301, International Search Report mailed Aug. 1, 2023", 3 pgs.
(Continued)

*Primary Examiner* — Richard T Torrente
(74) *Attorney, Agent, or Firm* — Schwegman, Lundberg & Woessner, P.A.

(57) ABSTRACT

The invention relates to a 2D/3D switchable autostereoscopic display device which is optimized in that it exhibits reduced moire. This is performed by providing a nanorelief structure on a surface that is in contact with a liquid crystal switching medium. This results in scattering, which on its turn reduces moire. The amount of scattering can be influenced by varying an electric field that is applied to the liquid crystal medium. The invention further relates to a method for reducing moire in an autostereoscopic display device and to a method for manufacturing an autostereoscopic display device.

14 Claims, 5 Drawing Sheets

(51) Int. Cl.
*G02B 3/12* (2006.01)
*G02B 30/28* (2020.01)
*H04N 13/359* (2018.01)

(52) U.S. Cl.
CPC ........... *G02B 30/28* (2020.01); *H04N 13/359* (2018.05); *H04N 2213/001* (2013.01)

(56) References Cited

U.S. PATENT DOCUMENTS

| | | |
|---|---|---|
| 2017/0343826 A1 | 11/2017 | De Zwart et al. |
| 2022/0384747 A1* | 12/2022 | Sun ........................ H10K 59/87 |

FOREIGN PATENT DOCUMENTS

| | | |
|---|---|---|
| TW | 202403397 A | 1/2024 |
| TW | I875011 | 3/2025 |
| WO | 2004070451 | 8/2004 |
| WO | WO-2007072241 A1 | 6/2007 |
| WO | WO-2023234774 A1 | 12/2023 |

OTHER PUBLICATIONS

"International Application Serial No. PCT/NL2023/050301, Written Opinion mailed Aug. 1, 2023", 5 pgs.
"Taiwanese Application Serial No. 112120221, Office Action mailed Feb. 5, 2024", w/ English Translation, 13 pgs.

* cited by examiner

MOIRE REDUCTION IN AN AUTOSTEREOSCOPIC DISPLAY DEVICE

CROSS-REFERENCE TO RELATED APPLICATION

This application is a U.S. National Stage Filing under 35 U.S.C. 371 from International Application No. PCT/NL2023/050301, filed on May 30, 2023, and published as WO 2023/234774, which claims priority to Netherlands Patent Application No. 2032040, filed May 31, 2022, each of which applications are incorporated herein by reference in their entirety.

FIELD OF THE INVENTION

The invention relates to an autostereoscopic display device exhibiting a reduced moire, to a method for reducing moire in an autostereoscopic display device, and to a method for manufacturing an autostereoscopic display device that exhibits a reduced moire.

BACKGROUND

Displays capable of electrically switching between two-dimensional and three-dimensional view modes, commonly known as 2D/3D switchable autostereoscopic displays, have attracted great attention in the last two decades. A common approach is to line an array of pixels (display pixel elements) with a lenticular device that comprises an array of semi-cylindrical micro-lenses (lenticulars) adjacent to a liquid crystal medium which can switch between two liquid crystalline orientations under the influence of an electric field. In a first orientation, the director of the liquid crystal medium is in the plane of the display; and in a second orientation the director of the liquid crystal medium is perpendicular to the plane of the display.

In such set-up, each lenticular is associated with a group of at least two columns of (sub-)pixels that extend parallel with the lens, or under an angle thereto (slanted). Pixel output travelling through the lenticular device is subject to the optical properties of the lenticulars and the liquid crystal medium. The refractive index of the lenticulars is fixed, but the refractive index of the adjacent liquid crystal medium can be switched between two values by switching between the two liquid crystalline orientations; a first refractive index corresponds to light polarized along the director of the liquid crystal, and a second refractive index corresponds to light polarized perpendicular to the director. As the pixel output travels substantially perpendicular to the plane of the display, it 'sees' either the first or the second refractive index. In a first view mode, the liquid crystal medium is in the first orientation. Its refractive index matches that of the lenticulars, thereby depriving the lenticulars from a focusing effect and causing the lenticular device to behave as a transparent and flat optical panel. This forms the two-dimensional view mode of the autostereoscopic display. In a second view mode, the liquid crystal medium is in the second liquid crystalline orientation. The refractive indexes do not match, which allows each lenticular to exhibit a focusing effect. This makes it possible to direct the output from different pixel columns to different spatial positions in front of the autostereoscopic display, which on its turn allows a viewer to perceive a three-dimensional image composed of a left image and a right image. This forms the three-dimensional view mode of the autostereoscopic display.

A problem with many 2D/3D switchable autostereoscopic displays is that a viewer perceives moire patterns due to the superimposition of the pattern of the pixel array and the pattern of the lenticular array. Such patterns are usually disturbing to the viewer. Further, moire makes the screen itself visible, as for instance reflections also do. This brakes the illusion of a "free floating" three-dimensional image in the space before or behind the screen.

To date, many efforts have been deployed to reduce or even completely cancel moire patterns in this type of displays. For example, it is possible to identify the pixels that make the largest contribution to the moire and to then modify their pixel output in a specific way. This however has undesired side-effects such as a reduced resolution and reduced display intensity. It also requires valuable processor capacity. Other solutions concern the application of specific pixel shapes and pixel arrangements in combination with specific lenticular slant angles. This however limits the design opportunities of the autostereoscopic display device and it makes fabrication processes more critical, as slant deviations as small as a fraction of a degree can already cause moire.

SUMMARY OF THE INVENTION

It is therefore an object of the present invention to find a solution to the appearance of moire patterns, in particular one that does not exhibit one or more of the abovementioned side-effects. It is also an object to provide a solution that is less complicated than solutions known in the art. It is more generally an object of the present invention to improve the viewing experience of a viewer of an autostereoscopic display.

It has now been found that one or more of these objects can be reached by applying a certain modification to a surface adjacent to the liquid crystal medium in the switchable autostereoscopic display.

Accordingly, the present invention relates to an autostereoscopic display device (10) that is electrically switchable from a first view mode to a second view mode, the autostereoscopic display device (10) comprising a display panel (1) having an array of display pixel elements for producing a display output;

a lenticular device (2) provided over the display panel (1) that is electrically switchable to provide the first view mode or the second view mode, wherein in one of the two view modes the lenticular device (2) comprises lenticular lens areas which are capable of directing the display output from different display pixel elements to different spatial positions within a field of view of the autostereoscopic display device (10) to allow a display of an autostereoscopic image that is composed of a left image and a right image, the lenticular device (2) comprising a first optically transparent substrate (4) comprising an array of lenticular elements provided over the first optically transparent substrate (4), wherein the lenticular elements have a first surface (4a) with liquid crystal alignment properties;

a second optically transparent substrate (5) having a second surface (5a) with liquid crystal alignment properties, the first surface (4a) and the second surface (5a) facing each other;

a first planar switching electrode (6) arranged at a side of the first optically transparent substrate (4);

a second planar switching electrode (7) arranged at a side of the second optically transparent substrate (5);

a liquid crystal medium (8) comprising liquid crystal molecules (9), the liquid crystal medium (8) being sandwiched between the two substrates (4, 5) wherein it is in contact with the first surface (4*a*) and the second surface (5*a*), wherein 1. in the first view mode, the liquid crystal molecules (9) are lying in the plane of the planar switching electrodes (6, 7); and 2. in the second view mode, the liquid crystal molecules (9) are oriented normal to the two planar switching electrodes (6, 7);

means (3) for applying a switching voltage across both planar switching electrodes (6, 7) to effect the switching from the first view mode to the second view mode; wherein the first surface (4*a*) and/or the second surface (5*a*) comprise a surface relief structure (11) having surface relief dimensions that causes scattering of the display output when liquid crystal molecules (9) that are contained in the surface relief structure (11) have an orientation that provides a refractive index that is different from the refractive index of the surface relief structure (11).

The present invention further relates to method for reducing moire in an autostereoscopic display device, wherein the autostereoscopic display device is an autostereoscopic display device (10) as defined hereabove, the method comprising modifying the switching voltage in order to reduce moire.

The present invention further relates to a method for manufacturing an autostereoscopic display device, the method comprising providing an autostereoscopic display device as described hereabove; then performing the method as described hereabove.

DETAILED DESCRIPTION OF THE INVENTION

Figure 1:
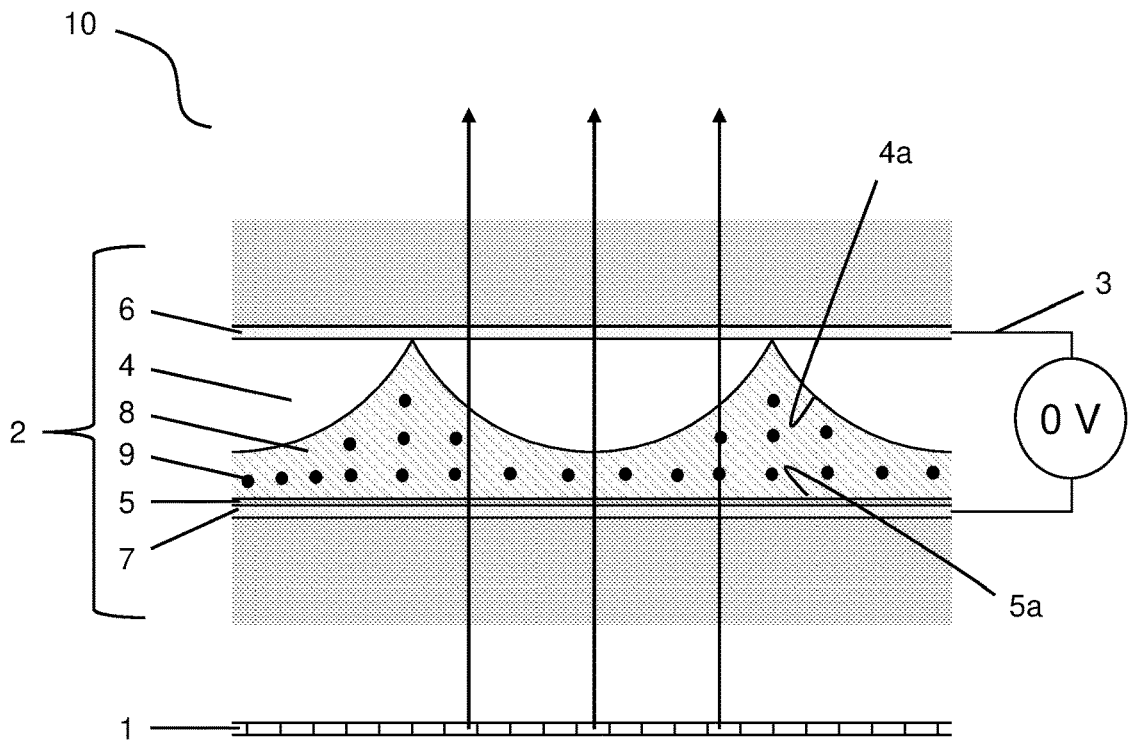
FIG. 1 schematically displays an autostereoscopic display device (10) in a first view mode.

Elements in the figures are illustrated for simplicity and clarity and have not necessarily been drawn to scale. For example, the dimensions of some of the elements in a figure may be exaggerated relative to other elements to help improve understanding of various exemplary embodiments of the present invention. For example, the relative dimensions of the different components of an autostereoscopic display device cannot be derived from the figures. This concerns for example the dimensions of the nanorelief structure relative to those of the lenticular elements and the schematic liquid crystal molecules. Neither can it be derived how the different the dimensions of the nanorelief structure itself are related to one another (e.g. height of the ridges, width of the ridges, and width of the valleys).

Further, the terms "first", "second", and the like in the present description and claims, if any, are generally used for distinguishing between similar elements and not necessarily for describing a sequential or chronological order.

In the context of the invention, by the term 'viewer' is meant a person who can consume, in particular view, content presented by an autostereoscopic display device. Throughout the text, references to the viewer will be made by male words like 'he', 'him' or 'his'. This is only for the purpose of clarity and conciseness, and it is understood that female words like 'she', and 'her' equally apply.

In the context of the invention, by the term 'moire' is meant a viewer's perception of a pattern (a 'moire pattern') that emerges by the superimposition of two real patterns that are slightly displaced, slightly rotated, and/or have a slightly different pitch. Also when the pitch of one pattern is nearly (but not exactly) an integer (2, 3, 4, etc.) multiplex of the pitch of the other pattern, moire may occur. Moire that is reduced or overcome in the present invention typically concerns the superimposition of the pattern of the pixel array and the pattern of the lenticular array.

It is understood that the liquid crystal medium is a birefringent material, having a first refraction index for linearly polarized light travelling along the director of the liquid crystal medium and a second refraction index for linearly polarized light travelling perpendicular to the director of the liquid crystal medium. When the term 'refraction index' is used throughout the text in relation to the liquid crystal medium, then—unless expressly stated otherwise—this refers to the refraction index of the liquid crystal medium in the direction normal to the planar switching electrodes, which is the direction wherein the display output (i.e. linearly polarized light) travels. This refraction index may refer to the first refraction index or the second refraction index as defined above, depending on the electric field that is applied across the liquid crystal medium.

In an autostereoscopic display device of the invention, the liquid crystal medium is present between two opposing surfaces, i.e. it is in contact with both surfaces. These concern the first surface, which is a surface of the lenticular elements that are provided over the first optically transparent substrate; and the second surface, which is a surface of the second optically transparent substrate. Both surfaces have liquid crystal alignment properties. Whereas the first surface is of a lenticular shape, the second surface may in principle have any shape. Usually, however, the second surface is a flat surface or a lenticular surface. In the latter case, there are two opposing lenticular surfaces.

The liquid crystal medium comprises liquid crystal molecules. The two planar switching electrodes are positioned on either side of the liquid crystal medium, so that they can apply an electric field to the liquid crystal medium. The liquid crystal molecules are capable of being oriented in the plane of the planar switching electrodes under the influence of the surfaces' alignment properties; or normal to the plane of the planar switching electrodes under the influence of a voltage that is applied across both planar switching electrodes. Each of these two different orientations gives rise to a different view mode.

Figure 2:
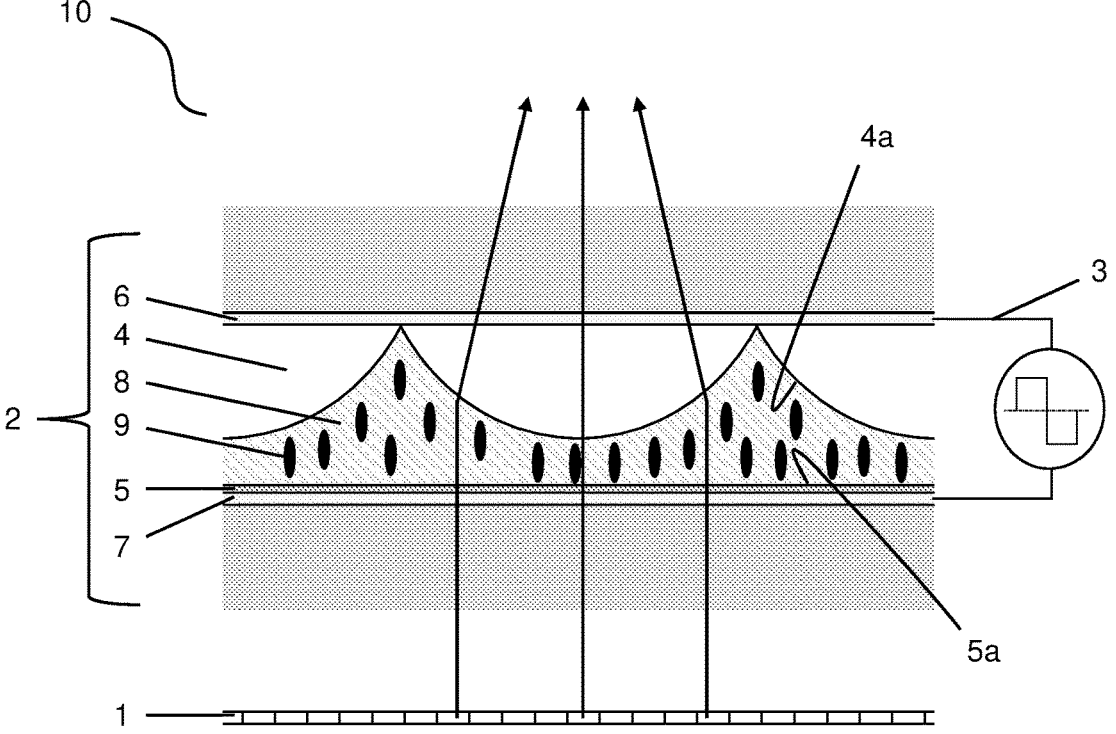
FIG. 2 schematically displays an autostereoscopic display device (10) in a second view mode.

These two view modes are illustrated in FIG. 1 and FIG. 2, respectively, which figures display a cross-sectional view of a liquid crystalline cell of an autostereoscopic display device (10) of the invention. It comprises a lenticular device (2) that is provided over a display panel (1) having an array of display pixel elements for producing a display output. The lenticular device (2) comprises a liquid crystal medium (8) comprising liquid crystal molecules (9). The liquid crystal medium (8) is being sandwiched between two optically transparent substrates (4, 5), which on their turn are sandwiched between two planar switching electrodes (6, 7). The liquid crystal medium (8) is adjacent to a first surface (4*a*) and a second surface (5*a*) of the two respective optically transparent substrates (4, 5). The lenticular device (2) is electrically switchable to provide a first view mode or a second view mode. The switching is performed by applying a switching voltage across the two planar switching electrodes (6, 7) for which a means (3) is provided. The liquid crystal molecules (9) in FIG. 1 have their elongated direction perpendicular to the plane in which the figure is presented. The liquid crystal molecules (9) in FIG. 2 have their elongated direction parallel to the plane in which the figure is presented.

In the absence of an electric potential, the molecules orient in the plane of the planar switching electrodes and in accordance with the liquid crystal alignment properties of the first and the second surface, defining a first view mode. When a sufficiently strong electric potential is applied (the 'switching voltage') they switch to an orientation in line with the corresponding electric field, which is normal to the plane of the planar switching electrodes, defining a second view mode. Thus, the switching voltage is a voltage at which the autostereoscopic display device changes to and stays in its second view mode. There is usually a threshold voltage above which the change to the second view mode takes place. So, the switching voltage is in principle any voltage above this threshold voltage.

In autostereoscopic display devices that are electrically switchable between two view modes, there is a switching from one liquid crystalline orientation to another. This occurs by changing the electric field which the liquid crystal medium is subject to. The bulk of the liquid crystal medium obeys this electric field and makes the switch, occurring homogeneously through the medium. This is however not so much the case at the interface of the liquid crystal medium with the surfaces that have the liquid crystal alignment properties. Here, the liquid crystal molecules are anchored to the surface that aligns them, under the fluence of an anchoring force. They have no substantial orientational freedom, especially the first layer of liquid crystal molecules. As a result, when liquid crystal molecules are aligned on the surface and in the plane of the surface, they are less prone to switching to an orientation perpendicular to the surface than those of the bulk do. This is due to the force of the anchoring and leads to a situation where the bulk (i.e. molecules further away from the surface) has made the switch and a small layer bordering the surface has not. In the context of the present invention, this layer is termed a 'boundary layer'. It is estimated that the boundary layer has no discrete transition to the bulk, but that neighboring liquid crystal molecules gradually adapt their orientation to that of the bulk.

The presence of the boundary layer has the effect that the refractive index of the liquid crystal medium close to the surface is different from that of the bulk. This means that it is possible to create a situation wherein a part of the liquid crystal medium has a refractive index that matches that of the material enclosing the liquid crystal medium (typically the lenticular elements and the second optically transparent substrate); and wherein another part has a non-matching refractive index. This comes down to two situations: 1) the refractive index of the boundary layer matches that of the enclosing material, while that of the bulk is different; and 2) the refractive index of the bulk matches that of the enclosing material, while that of the boundary layer is different.

The first situation has the effect that the display output of the display pixel elements (i.e. light) that travels through the enclosing material 'experiences' that the enclosing material is slightly thicker than it is in reality. This is because the light travels a longer distance through a medium with a particular refractive index; in other words, as far as refraction is concerned, the light 'sees' no difference between the enclosing material and the boundary layer.

The present invention makes use of this first situation for the reduction of moire.

First, a nanorelief structure on the surface of the enclosing material (or a part thereof) is introduced. This structure scatters the pixel output, which on its turn reduces moire.

Second, the extent of the scattering can be controlled by increasing the thickness of the boundary layer. When the boundary layer is thin, then the nanorelief structure is highly 'visible' to the pixel output. The thicker the boundary layer is, the more the nanorelief structure becomes 'submerged' by it and the more 'invisible' it is to the pixel output. This is due to the effects outlined hereabove, specifically those occurring in situation 1). Herein, structural features in the nanorelief structure become surrounded by a medium of the same refractive index, which effectively deprives them from their light scattering properties.

The thickness of the boundary layer can be tuned by varying the switching voltage; the higher the voltage (and thus the electric field), the higher the force that is induced to overcome the anchoring force of the surface and to switch the orientation of liquid crystal molecules close to the surface on which they are aligned. Thus, by varying the switching voltage, the severity of scattering can be influenced.

The inventors have now found that the occurrence of moire can be diminished by applying an appropriate electric field.

It is further contemplated that, theoretically, the favorable scattering may have an increased crosstalk as a side effect. By crosstalk is meant the phenomenon in autostereoscopic displays that a (small) portion of light from a display pixel element that is intended for the left eye arrives at the right eye and vice versa. It will be explained below how the present invention may solve an eventual occurrence of crosstalk caused by scattering.

As stated above, the thickness of the boundary layer can be tuned by varying the switching voltage. This changes the extent to which pixel output is scattered, which influences moire patterns. Therefore, according to the invention, moire can be reduced by an appropriate tuning of the voltage across both planar switching electrodes. An important element of an autostereoscopic display device of the invention is therefore the means for applying such switching voltage across both planar switching electrodes.

In an embodiment, this means (3) is configured to apply a switching voltage that allows the nanorelief structure to cause scattering of the display output and reduction of moire. In this embodiment, the means is manufactured with a switching voltage that has been proven to cause less moire than other switching voltages, and/or wherein an optimum has been reached with respect to moire and image quality. This is typically a factory setting that remains the same during the entire lifetime of the display device.

In another embodiment, the means is capable of applying at least two switching voltages of different magnitude. In this embodiment, it is possible to select a switching voltage that provides the largest reduction of moire. Thus, with this embodiment, it is possible to optimize the settings of the autostereoscopic display device.

This may be performed in the factory as part of the manufacturing of the autostereoscopic display device. Since (slant) deviations as small as a fraction of a degree can already cause moire, manufacturing processes normally have very small tolerances. When the occurrence of moire can be remedied after the manufacturing, then these tolerances can be widened, which is advantageous.

Also, during manufacturing the parameters of the lenticular device (e.g. pitch, slant) and the nanorelief structure parameters can be at first chosen to be roughly correct. Secondly, after the assembly of the autostereoscopic display device from its different components, a finetuning can be performed for each product, or for each product series, by setting an appropriate switching voltage. Whereas for a conventional autostereoscopic display device several iteration cycles in design and manufacturing are necessary, these can be skipped with an autostereoscopic display device of the invention.

The optimization of the settings of the autostereoscopic display device may alternatively be performed by a viewer of the device at his own discretion, typically when he is disturbed by a moire pattern. Therefore, in an embodiment, the autostereoscopic display device of the invention is designed to allow a viewer of the autostereoscopic display device to reduce moire by adjusting the switching voltage.

When the means for applying a switching voltage is capable of applying at least two switching voltages of different magnitude, their number is usually higher than two, for example it is at least three, at least four, at least five, at least seven or at least ten. It may also be at least 15, at least 25 or at least 50. It may also be continuously variable.

Figure 3:
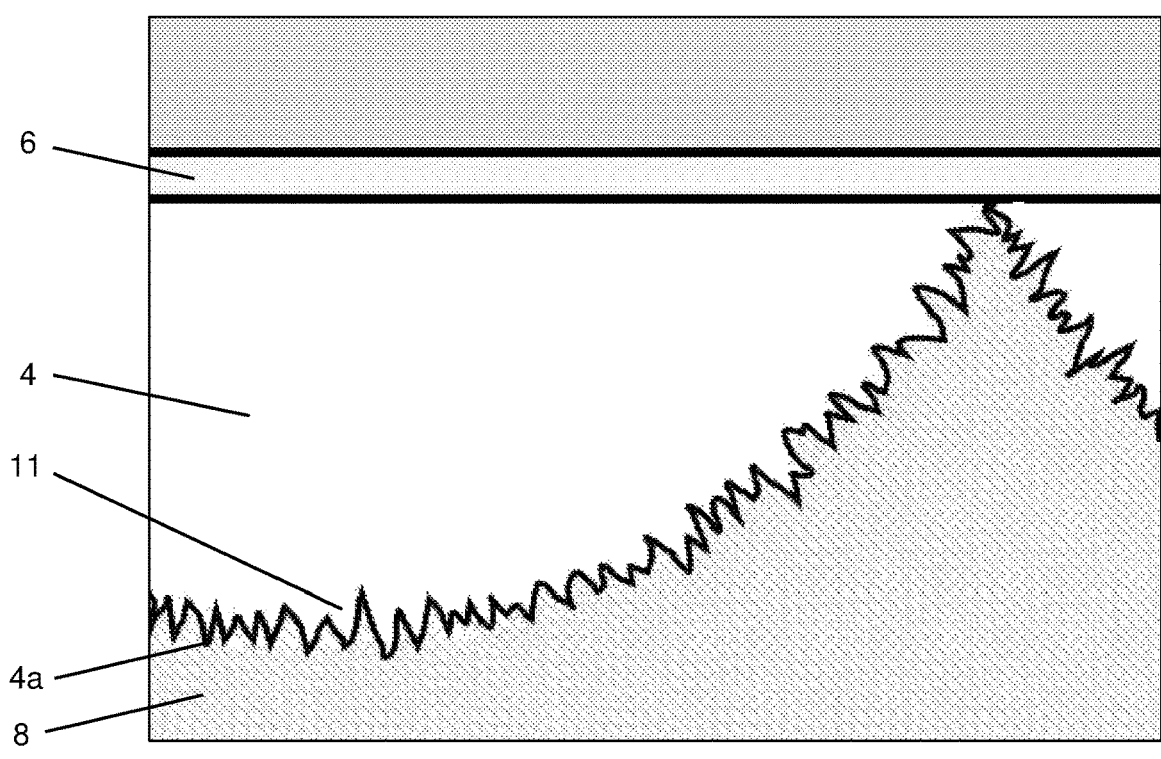
FIG. 3 displays a cross-section of a nanorelief structure (11) superimposed upon a surface of the first optically transparent substrate (4).
Figure 4:
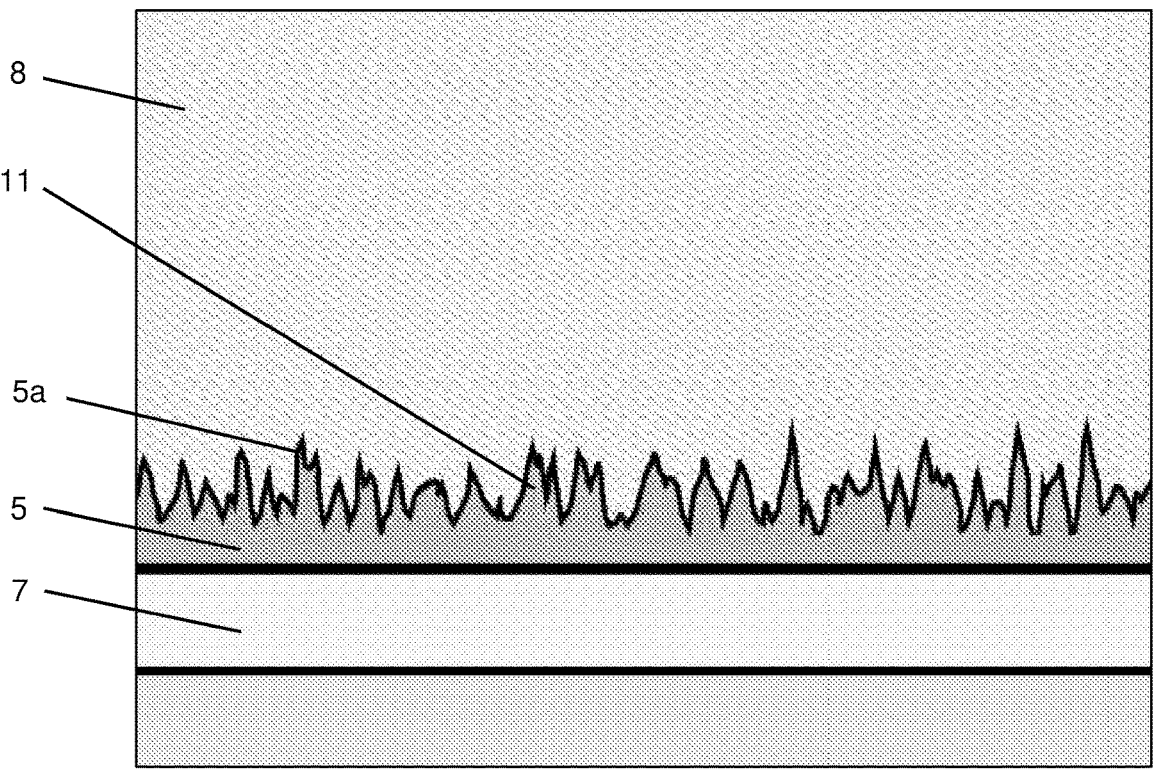
FIG. 4 displays a cross-section of a nanorelief structure (11) superimposed upon a surface of the second optically transparent substrate (5).

The nanorelief structure is a surface relief of the surface of the lenticular elements of the first optically transparent substrate and/or of the surface of the second optically transparent substrate. This means that the nanorelief structure is a structure that is superimposed upon the respective surface. Since the surface of the first optically transparent substrate is a lenticular surface (i.e. a surface of the lenticular elements), the nanorelief structure is superimposed upon this lenticular surface. Analogously, since the surface of the second optically transparent substrate is a flat surface, the nanorelief structure is superimposed upon this flat surface. This is illustrated in FIGS. 3 and 4, which show an enlargement of a part of a cross-sectional view of a liquid crystalline cell of an autostereoscopic display device (10) of the invention (FIGS. 1 and 2 showing a bigger portion of such cell but in less detail). The FIGS. 3 and 4 show a cross-section of a nanorelief structure (11) on each of the optically transparent substrates (4, 5).

FIG. 3 shows a cross-section of a nanorelief structure (11) superimposed upon the first optically transparent substrate (4). This is a cross-section of a lenticular element (perpendicular to its elongate direction) of the first optically transparent substrate (4). Along the curve of the lenticular cross-section are a large number of neighboring valleys and ridges (also viewed cross-sectionally perpendicular to their elongate direction). The first surface (4a) of the first optically transparent substrate (4) is formed by the valleys and ridges.

FIG. 4 shows a cross-section of a nanorelief structure (11) superimposed upon the second optically transparent substrate (5). Along the straight cross-section of the second optically transparent substrate (5) are a large number of neighboring valleys and ridges (viewed cross-sectionally perpendicular to their elongate direction). The second surface (5a) of the second optically transparent substrate (5) is formed by the valleys and ridges.

As the liquid crystal medium (8) is sandwiched between the two optically transparent substrates (4, 5) wherein it is in contact with their respective surfaces (4a, 5a), the nanorelief structure is completely immersed in the liquid crystal medium (8). This means that the liquid crystal molecules (9) completely fill the valleys of the nanorelief structure, so that surfaces of the valleys and ridges are at an interface of the respective optically transparent substrate (4 or 5) with the liquid crystal medium (8).

The nanorelief structure has surface relief dimensions that cause scattering of display output when the nanorelief structure is illuminated by the display output, for example when the display output passes through it (and through the respective optically transparent substrate of which the nanorelief structure form part). This design requirement relies on a situation wherein the nanorelief structure (or a part of it) has an interface with a liquid crystal medium that has a refractive index that does not match with the refractive index of the nanorelief structure (which is thus the refractive index of the respective optically transparent substrate of which the nanorelief structure forms part), when the liquid crystal molecules are oriented normal to the two planar switching electrodes. This requires that liquid crystal molecules with this normal orientation are contained in the nanorelief structure, i.e. that they are present in the valleys between the ridges of the nanorelief structure. In other words, this concerns a situation wherein the boundary layer does not completely cover the nanorelief structure; and thus wherein at least part of the nanorelief structure (in particular its ridges) resides in the bulk of the liquid crystal medium where the liquid crystal molecules are oriented normal to the two planar switching electrodes. In this way, the nanorelief structure becomes 'visible' to the display output and so causes scattering of the display output.

Figure 5:
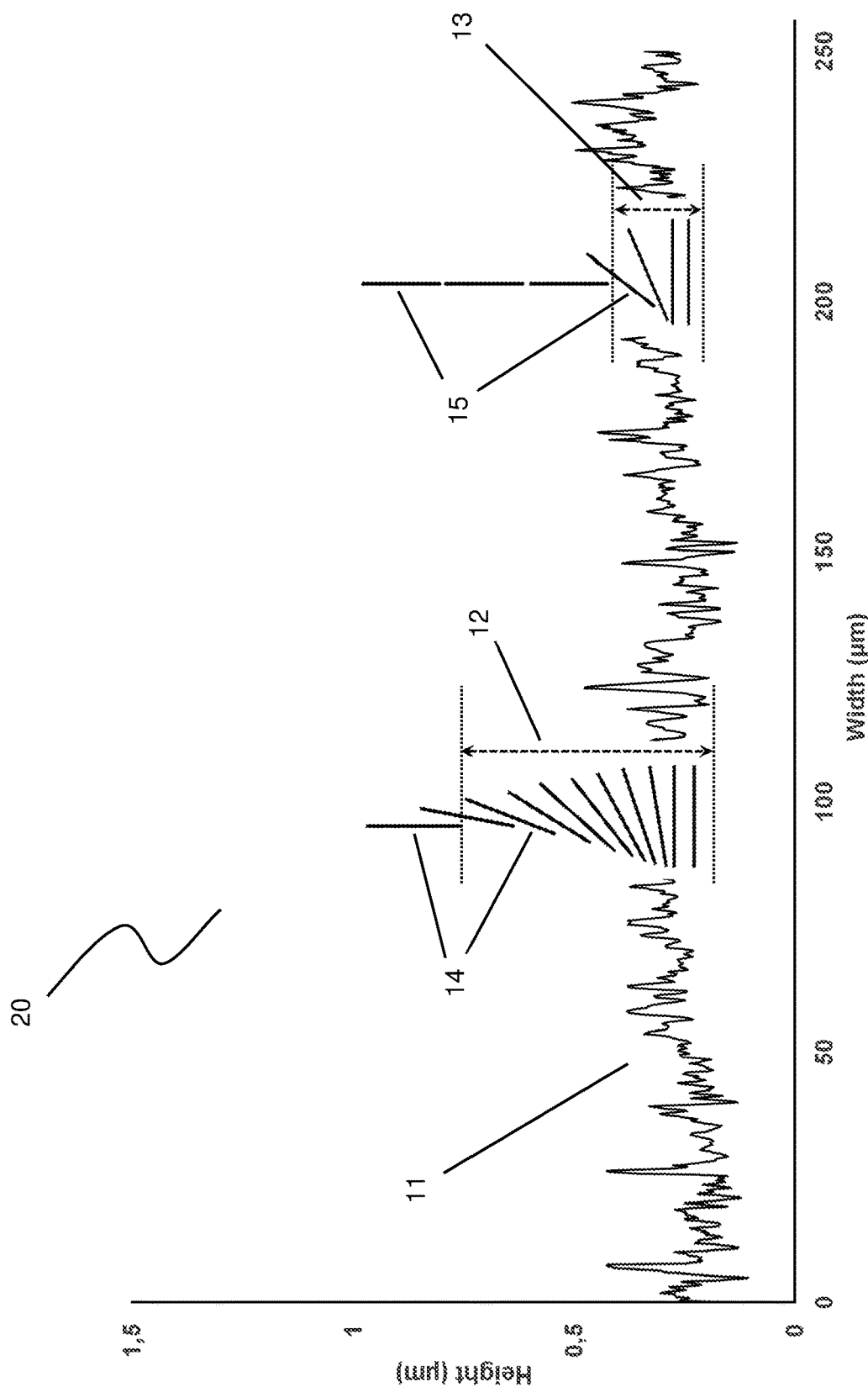
FIG. 5 displays a graph (20) of the height of the nanorelief structure (11) as a function of a direction on the surface.

This is visualized in FIG. 5, showing a graph (20) of the height of the nanorelief structure (11) as a function of a direction on the surface. On the left, a thick boundary layer (12) is superimposed on the graph (20), while on the right, a thin boundary layer (13) is superimposed on the graph (20). Liquid crystalline molecules (14) in the thick boundary layer (12) are only present 'above' the nanorelief structure, while liquid crystalline molecules (15) in the thin boundary layer (13) are also present between the peaks (or ridges) of the nanorelief structure (11).

In order to truly effect the required scattering, the nanorelief structure needs to have the appropriate dimensions for scattering of the display output. A person skilled in the art knows how to create and implement such nanorelief structure by routine experimentation and without exerting an inventive effort.

For example, surface features that are responsible for the scattering usually have at least one dimension that is in the range of 1-1,000 nm, preferably in the range of 1-500 nm.

Usually, the height of the nanorelief structure (and thus the surface features) is 1,000 nm or less, preferably 500 nm or less. A large relief height requires a thick boundary layer on the lens in order to arrive at a certain amount of scattering. Since this thick boundary layer significantly adds to the lens, it effectively results in lens deformation. Since lens deformation is preferably minimal (because it leads to impaired view, in particular crosstalk), it is preferred that the height of the nanorelief structure (and thus the surface features) is limited.

The nanorelief structure is preferably not periodic and/or does not have a regular structure, since this may give rise to moire patterns.

Preferably, the nanorelief structure comprises substantially parallel grooves. These provide the advantage that—when oriented horizontally—they minimize scattering in the horizontal direction. This on its turn minimizes scattering-induced crosstalk, since crosstalk is the result of aberration of light in the horizontal direction. By crosstalk is meant the phenomenon in autostereoscopic displays that a (small) portion of light from a display pixel element that is intended for the left eye arrives at the right eye and vice versa—a horizontal deviation. Crosstalk impairs the quality of the experienced three-dimensional view. Horizontal grooves have the property that they scatter light predominantly in a vertical direction; and crosstalk is largely insensitive to scattering in the vertical direction. Therefore, when grooves are present, they are preferably oriented horizontally (i.e. extending between left and right in the viewer's field of view). This means that the grooves run preferably parallel to a lateral direction wherein the left image and the right image are displaced, i.e. the left-right direction that is set by the lateral displacement of the left image and the right image which the autostereoscopic display device is configured to generate. The grooves may also run in a direction that deviates less than 30° or less than 20° from such lateral direction, preferably less than 10° or less than 5°.

Since autostereoscopic display devices are usually rectangular and usually viewed in a landscape direction (rather than portrait), the groove direction usually corresponds to the elongate direction of the device. This direction ideally corresponds to the viewer's inter pupil direction, i.e. the direction of an imaginary line connecting both eyes. In practice, a viewer moves and rotates with respect to the display device, leading to variations in the direction over time.

Usually, the grooves have a height of 1,000 nm or less. Preferably, it is 500 nm or less, because a large height causes more lens deformation (see explanation above). Their width is usually in the range of 50-5,000 nm. Their length is usually at least 10 μm. For example, it is in the range 10-10,000 μm or in the range of 20-2,000 μm.

Grooves preferably are not periodic and/or do not have a regular structure, since this may give rise to moire patterns. Their length is in principle not limited, but it is contemplated that a plurality of very long (and parallel) grooves may also give rise to moire effects.

When the nanorelief structure is present as grooves, then there are two surface properties that are defined by their direction; the grooves and the liquid crystal alignment. In a preferred embodiment, both directions are the same or substantially the same. Accordingly, in an autostereoscopic display device according to the invention, the liquid crystal alignment properties comprise a property to align liquid crystal molecules in a direction that is in line with the direction of the substantially parallel grooves.

It is however also possible that the nanorelief structure comprises surface features without a preference for a certain direction. For example, the nanorelief structure comprises surface features in random orientations, having a length, width and height, wherein the width and the length are independently of one another in the range of 50-5,000 nm;

the height is in the range of 1-500 nm;

the length is not more than 4 times the width.

It is generally preferred that the nanorelief structure is designed in such manner that more than 50%, preferably more than 80% and more preferably more than 90% of the scattered display output is scattered in a direction that is perpendicular to the lateral direction wherein the left image and the right image are displaced, i.e. the left-right direction that is set by the lateral displacement of the left image and the right image which the autostereoscopic display device is configured to generate. The direction may also deviate less than 30° or less than 20° from such lateral direction, or less than 10° or less than 5°. This direction is ideally perpendicular to the viewer's inter pupil direction, i.e. the direction of an imaginary line connecting both eyes.

Since autostereoscopic display devices are usually rectangular, and usually viewed in a landscape direction (rather than portrait), the scattering direction usually corresponds to the short direction of the device.

The nanorelief structure is present on one or both surfaces between which the liquid crystal medium is sandwiched. Accordingly, in an autostereoscopic display device according to the invention, the nanorelief structure is present on the first surface and not on the second surface; or the nanorelief structure is present on the second surface and not on the first surface; or the nanorelief structure is present on the first surface as well as on the second surface.

The invention further relates to a method for reducing moire in an autostereoscopic display device, wherein the autostereoscopic display device is an autostereoscopic display device as described hereabove, the method comprising modifying the switching voltage in order to reduce moire.

This method basically makes use of the autostereoscopic display device of the invention as described hereabove, including all the embodiments as described hereabove.

The method of the invention comprises optimizing the switching voltage in order to reduce moire. This typically comprises modifying the switching voltage, in particular increasing the switching voltage. This may be performed during the manufacturing of the autostereoscopic display device (typically after assembly of the main components) or by the viewer. Since moire is difficult to capture with a camera (as this may even introduce moire in the camera recording), the optimization is preferably performed manually, i.e. by a person.

In an embodiment, optimizing the switching voltage comprises applying a sequence of the following steps:

1) increasing the voltage across the two planar switching electrodes by a certain magnitude; then 2) observing the autostereoscopic display device and checking whether a moire pattern can be observed; then 3) in case a moire pattern can be observed, deciding whether it is desired to reduce it; then 4) in case it is desired to reduce it, repeating the method steps 1) to 4) until no moire pattern can be observed anymore; or until an acceptable moire pattern can be observed.

Preferably, in this method account is also taken of an eventual presence of crosstalk. This can be implemented by a method step wherein it is checked whether cross-talk is present, and wherein it is decided whether it is desired to reduce it.

A stated above, an appropriate voltage which reduces moire may be incorporated in a autostereoscopic display device of the invention, as a factory setting. Accordingly, a method of the invention may also be used during the manufacturing of an autostereoscopic display device of the invention. Therefore, the invention further relates to a method for manufacturing an autostereoscopic display device, the method comprising providing an autostereoscopic display device as described hereabove;

performing a method as described hereabove.

EXAMPLE

A non-periodic nanorelief structure was created in a flat piece of copper using unidirectional mechanical abrasion. This unidirectional nanorelief structure is represented by the structure (11) in the graph (20) of FIG. 5. A photo-polymerizable resin was poured over the copper nanorelief structure and an ITO glass plate was placed on top followed by UV curing. After detachment from the copper piece, a glass plate with cured resin was obtained wherein a unidirectional nanorelief structure was present on the cured resin.

A rubbed polyimide-coated glass plate was provided wherein an ITO glass plate was sandwiched between the polyimide and the glass.

Then, a twisted nematic liquid crystalline cell was prepared by using the nanorelief glass plate and the rubbed polyimide-coated glass plate, wherein the nanorelief structure faced the rubbed poly-imide side. The cell was capillary filled with the twisted nematic liquid crystalline and closed with glue. Wires were attached followed by a curing step at elevated temperature.

Figure 7:
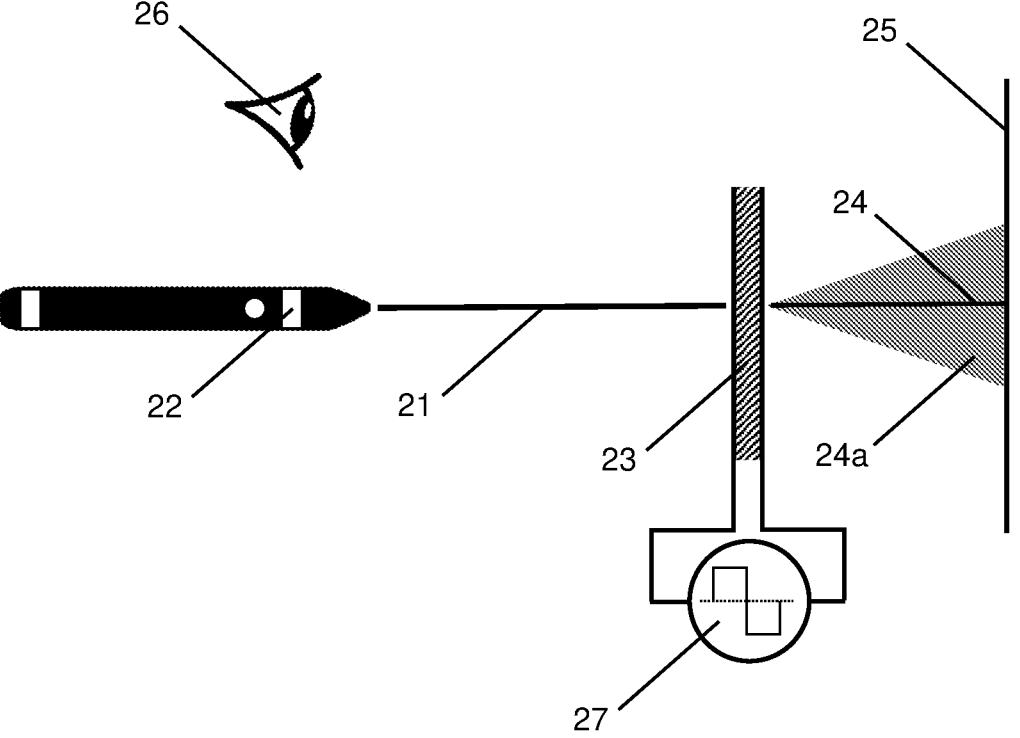
FIG. 7 schematically displays an experimental setup according to the Example.

A setup was then made as displayed in FIG. 7. Light (21) of a laser pointer (22) was allowed to transmit through the liquid crystalline cell (23) and the egressing light (24) was projected on a piece of paper (25) to make it visible to an observer (26). The unidirectional nanorelief structure was directed perpendicular to the plane of FIG. 7. Means (27) for applying a switching voltage are present, capable of applying a continuously variable voltage across the liquid crystalline cell (23). A volt meter (not shown) that indicates the applied voltage is also visible to the observer (26). Depending on the voltage, a portion of the egressing light (24) is scattered light 24a, which is also projected on the paper (25).

Figure 6:
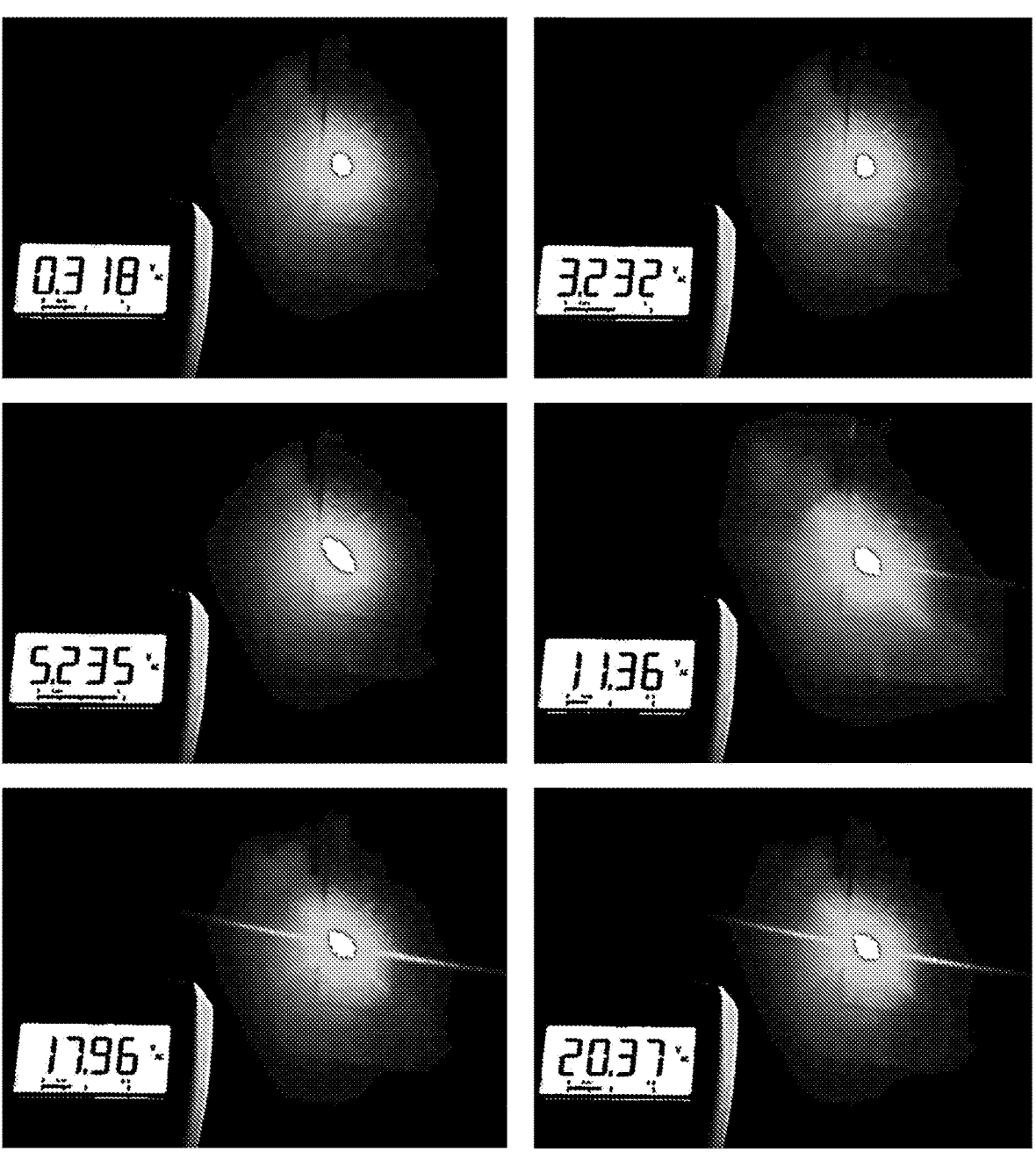
FIG. 6 displays six photographs of light transmission through a liquid crystal cell comprising a unidirectional nanorelief structure, wherein different voltages are applied across the cell, according to the Example.

An electric field was applied on the liquid crystalline cell by applying a voltage that was slowly increased from zero to 30 V. Until approximately 11 V, the projection of the egressing light (24) on the paper (25) was sharp, which means that the laser light (21) was not refracted/scattered. At around 11 V, the laser light (21) starts to refract perpendicular to the unidirectional nanorelief structure. This effect intensifies until approximately 18 V, after which it remained constant. Different stages during increasing the voltage are displayed in the six photographs of FIG. 6. A display of the actually applied voltage is present on the foreground of each photograph and the piece of paper (25) in the background.

The invention claimed is:

1. An Autostereoscopic display device that is electrically switchable from a first view mode to a second view mode, the autostereoscopic display device comprising:

a display panel having an array of display pixel elements for producing a display output; and a lenticular device provided over the display panel that is electrically switchable to provide the first view mode or the second view mode, wherein in one of the two view modes the lenticular device comprises lenticular lens areas which are configured to direct the display output from different display pixel elements to different spatial positions within a field of view of the autostereoscopic display device to allow a display of an autostereoscopic image that includes a left image and a right image, the lenticular device comprising:

a first optically transparent substrate comprising an array of lenticular elements, wherein the lenticular elements have a first surface with liquid crystal alignment properties;

a second optically transparent substrate having a second surface with liquid crystal alignment properties, the first surface and the second surface facing each other;

a first planar switching electrode at a side of the first optically transparent substrate;

a second planar switching electrode at a side of the second optically transparent substrate;

a liquid crystal medium comprising liquid crystal molecules, the liquid crystal medium being sandwiched between the two optically transparent substrates wherein the liquid crystal medium is in contact with the first surface and the second surface, wherein 1. In the first view mode, the liquid crystal molecules are aligned in a plane of the planar switching electrodes; and 2. In the second view mode, the liquid crystal molecules are oriented normal to the two planar switching electrodes;

means for applying a switching voltage across both planar switching electrodes to effect the switching from the first view mode to the second view mode;

wherein a nanorelief structure is provided on the first surface of the lenticular elements of the first optically transparent substrate; and/or on the second surface of the second optically transparent substrate;

wherein the nanorelief structure comprises valleys between ridges, the valleys being filled with liquid crystal molecules of the liquid crystal medium;

and wherein the nanorelief structure is configured to scatter a display output when the nanorelief structure is illuminated by the display output and when the liquid crystal molecules in the valleys of the nanorelief structure have an orientation that provides the liquid crystal medium in the valleys with a refractive index that is different from the refractive index of the nanorelief structure.

2. The Autostereoscopic display device according to claim 1, wherein the means for applying a switching voltage is configured to apply a switching voltage that allows the nanorelief structure to cause a scattering of the display output and a reduction of moire.

3. The Autostereoscopic display device according to claim 1, wherein the means for applying a switching voltage is configured to apply at least two switching voltages of a different magnitude.

4. The Autostereoscopic display device according to claim 1, wherein a moire characteristic of the autostereoscopic display device is adjustable according to the switching voltage.

5. The Autostereoscopic display device according to claim 1, wherein the nanorelief structure comprises substantially parallel grooves in a direction that is parallel to a lateral displacement direction of the left image and the right image, or a direction that deviates less than 10° from such lateral displacement direction.

6. The Autostereoscopic display device according to claim 5, wherein the grooves have a height in the range of 1-1,000 nm and a width in the range of 50-5,000 nm.

7. The Autostereoscopic display device according to claim 5, wherein the liquid crystal alignment properties comprise a property to align liquid crystal molecules in a direction that is in line with the direction of the substantially parallel grooves.

8. The Autostereoscopic display device according to claim 1, wherein the nanorelief structure comprises surface features in random orientations, having a length, width and height, wherein;

the width and the length are independent of one another in the range of 50-5,000 nm; and the height is in the range of 1-500 nm; and the length is not more than 4 times the width.

9. The Autostereoscopic display device according to claim 1, wherein more than 80% of the scattered display output is scattered in a direction that is perpendicular to a lateral displacement direction of the left image and the right image, or in a direction that deviates less than $10°$ from such lateral direction.

10. The Autostereoscopic display device according to claim 1, wherein the nanorelief structure is present on the first surface and not on the second surface; or the nanorelief structure is present on the second surface and not on the first surface; or the nanorelief structure is present on the first surface as well as and on the second surface.

11. The Autostereoscopic display device according to claim 1, wherein the nanorelief structure is not periodic and/or does not have a regular structure.

12. A Method for reducing moire in the autostereoscopic display device of claim 1, the method comprising modifying the switching voltage to reduce moire.

13. The Method according to claim 12, wherein modifying the switching voltage comprises:

1) Increasing the voltage across the two planar switching electrodes; then

2) Observing the autostereoscopic display device and checking whether a moire pattern can be observed; then 3) In case a moire pattern can be observed, deciding whether it is desired to reduce it; then 4) In case it is desired to reduce it, repeating steps 1) to 4) until no moire pattern or an acceptable moire pattern is observed.

14. A method for manufacturing an autostereoscopic display device, the autostereoscopic display device electrically switchable from a first view mode to a second view mode, the autostereoscopic display device including a display panel having an array of display pixel elements for producing a display output, and a lenticular device provided over the display panel that is electrically switchable to provide the first view mode or the second view mode, wherein in one of the two view modes the lenticular device comprises lenticular lens areas which are configured to direct the display output from different display pixel elements to different spatial positions within a field of view of the autostereoscopic display device to allow a display of an autostereoscopic image that includes a left image and a right image, the lenticular device comprising:

a first optically transparent substrate comprising an array of lenticular elements, wherein the lenticular elements have a first surface with liquid crystal alignment properties;

a second optically transparent substrate having a second surface with liquid crystal alignment properties, the first surface and the second surface facing each other;

a first planar switching electrode at a side of the first optically transparent substrate;

a second planar switching electrode at a side of the second optically transparent substrate;

a liquid crystal medium comprising liquid crystal molecules, the liquid crystal medium being sandwiched between the two optically transparent substrates wherein the liquid crystal medium is in contact with the first surface and the second surface, wherein 1. In the first view mode, the liquid crystal molecules are aligned in a plane of the planar switching electrodes; and 2. In the second view mode, the liquid crystal molecules are oriented normal to the two planar switching electrodes; and means for applying a switching voltage across both planar switching electrodes to effect the switching from the first view mode to the second view mode;

wherein a nanorelief structure is provided on the first surface of the lenticular elements of the first optically transparent substrate and/or on the second surface of the second optically transparent substrate, and wherein the nanorelief structure comprises valleys between ridges, the valleys being filled with liquid crystal molecules of the liquid crystal medium, and wherein the nanorelief structure is configured to scatter a display output when the nanorelief structure is illuminated by the display output and when the liquid crystal molecules in the valleys of the nanorelief structure have an orientation that provides the liquid crystal medium in the valleys with a refractive index that is different from the refractive index of the nanorelief structure;

the method comprising: modifying the switching voltage to reduce moire.

\* \* \* \* \*